(12) United States Patent
Hino

(10) Patent No.: US 7,975,507 B2
(45) Date of Patent: Jul. 12, 2011

(54) PROCESS FOR PRODUCING SYNTHETIC QUARTZ GLASS AND SYNTHETIC QUARTZ GLASS FOR OPTICAL MEMBER

(75) Inventor: Keigo Hino, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 436 days.

(21) Appl. No.: 11/833,397

(22) Filed: Aug. 3, 2007

(65) Prior Publication Data

US 2007/0277555 A1 Dec. 6, 2007

Related U.S. Application Data

(63) Continuation of application No. PCT/JP2006/302093, filed on Feb. 1, 2006.

(30) Foreign Application Priority Data

Feb. 4, 2005 (JP) .................................. 2005-029124

(51) Int. Cl.
C03B 19/06 (2006.01)
C03B 8/04 (2006.01)
(52) U.S. Cl. ............................... 65/17.4; 65/426; 501/54
(58) Field of Classification Search .................... 65/17.4, 65/17.6, 104, 426; 501/54
See application file for complete search history.

(56) References Cited

U.S. PATENT DOCUMENTS

| 6,012,304 A * | 1/2000 | Loxley et al. ..................... 65/111 |
| 2002/0157420 A1 | 10/2002 | Hrdina et al. |
| 2005/0172676 A1* | 8/2005 | Roselieb et al. ................. 65/421 |
| 2007/0027018 A1* | 2/2007 | Ogawa et al. .................... 501/53 |

FOREIGN PATENT DOCUMENTS

| JP | 62-72536 | 4/1987 |
| JP | 6-92648 | 4/1994 |
| JP | 8-91867 | 4/1996 |
| JP | 9-52719 | 2/1997 |
| JP | 2001-180944 A | 7/2001 |
| JP | 2002-87833 | 3/2002 |
| JP | 3304131 B2 * | 7/2002 |
| JP | 2003-201124 | 7/2003 |
| WO | WO 03/091171 | 11/2003 |

OTHER PUBLICATIONS

Machine Translation of JP 09052719A. Accessed Nov. 30, 2009. Original Japanese Publication Feb. 25, 1997.*
Cambridge Glassblowing, "Glass Properties", <http://www.camglassblowing.co.uk/gproperties.htm>.*
U.S. Appl. No. 11/853,891, filed Sep. 12, 2007, Hino.

* cited by examiner

*Primary Examiner* — Matthew J Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

The invention provides a process for producing a synthetic quartz glass, comprising: (a) depositing fine quartz glass particles synthesized by flame hydrolysis of a glass-forming material, on a substrate, to form a porous quartz glass base; (b) presintering the porous quartz glass base; (c) heat-treating the presintered porous quartz glass base by holding it under vacuum at a temperature in the range of from 1,100° C. to below the vitrification temperature for a certain time period; and (d) heating the thus heat-treated porous quartz glass base to a temperature not lower than the vitrification temperature to obtain a synthetic quartz glass. According to the process for synthetic quartz glass production of the invention, a synthetic quartz glass having a reduced OH group amount and a uniform OH group concentration can be obtained. From the synthetic quartz glass, an optical member having excellent optical properties can be obtained.

18 Claims, 3 Drawing Sheets

PROCESS FOR PRODUCING SYNTHETIC QUARTZ GLASS AND SYNTHETIC QUARTZ GLASS FOR OPTICAL MEMBER

CROSS REFERENCE TO RELATED APPLICATION

This application is a continuation of PCT/JP06/302093, filed on Feb. 1, 2006, and claims priority to Japanese Patent Application No. 2005-029124, filed on Feb. 4, 2005.

TECHNICAL FIELD

The present invention relates to a process for producing a synthetic quartz glass and to a synthetic quartz glass for an optical member.

BACKGROUND ART

Known processes heretofore in use for producing a synthetic quartz glass for, e.g., an optical member such as a mirror or lens include a process which comprises forming a porous quartz glass base by a vapor-phase reaction method and heating this base to undergo vitrification (see, for example, patent document 1).

In the process for synthetic quartz glass production disclosed in patent document 1, a porous quartz glass base of a substantially cylindrical shape is formed by the so-called VAD (vapor-phase axial deposition) method in which a silicon compound, e.g., silicon tetrachloride, is introduced into an oxyhydrogen flame to synthesize fine quartz glass particles through flame hydrolysis and the fine quartz glass particles are deposited on a rotating substrate. In the process, this base is then heated to a temperature not lower than the vitrification temperature to obtain a synthetic quartz glass.

The synthetic quartz glass thus obtained contains hydroxyl groups (OH groups) typically in an amount of about 100 to 300 ppm (on a weight basis; the same applies hereinafter) because of the nature of the process. It is known that these OH groups reduce the transparency to infrared, transparency to vacuum ultraviolet, and other properties of the synthetic quartz glass. Various techniques for reducing the amount of OH groups in a synthetic quartz glass have been proposed (see, for example, patent document 2).

In the process for synthetic quartz glass production disclosed in patent document 2, a porous quartz glass base is held, before being heated to a temperature not lower than the vitrification temperature, for a certain time period in a fluorine-containing atmosphere having a pressure of from 100 Pa to 101 kPa and a temperature of from room temperature to 800° C. to thereby replace OH groups contained in the porous quartz glass base with fluorine atoms, whereby a reduction in OH group amount is attained.

Patent Document 1: JP-A-62-72536
Patent Document 2: JP-A-2003-201124

In general, the synthetic quartz glass obtained via a porous quartz glass base of a substantially cylindrical shape formed by the VAD method described above has a convex type OH group concentration distribution curve which indicates that the OH group concentration around the core is relatively high. Such OH group concentration distribution is a factor which causes the synthetic quartz glass to fluctuate in refractive index (striae). It is therefore preferred that a synthetic quartz glass for an optical member or the like should have a uniform OH group concentration.

According to the process for synthetic quartz glass production disclosed in patent document 2, it may be possible to narrow the fluctuation range of the OH group concentration by reducing the absolute amount of OH groups contained in the synthetic quartz glass. However, there is a desire for a more positive measure in attaining a uniform OH group concentration.

DISCLOSURE OF THE INVENTION

The invention has been achieved in view of the circumstances described above.

An object of the invention is to provide a process for synthetic quartz glass production which yields a synthetic quartz glass having a reduced OH group amount and a uniform OH group concentration.

Another object of the invention is to provide a synthetic quartz glass for an optical member by the production process.

For accomplishing the objects, the process for synthetic quartz glass production of the invention comprises:

(a) depositing fine quartz glass particles synthesized by flame hydrolysis of a glass-forming material, on a substrate, to form a porous quartz glass base;

(b) presintering the porous quartz glass base;

(c) heat-treating the presintered porous quartz glass base by holding it under vacuum at a temperature in the range of from 1,100° C. to below the vitrification temperature for a certain time period; and (d) heating the thus heat-treated porous quartz glass base to a temperature not lower than the vitrification temperature to obtain a synthetic quartz glass.

In this process for synthetic quartz glass production, which has the constitution described above, fine quartz glass particles synthesized by flame hydrolysis of a glass-forming material are deposited on a substrate to form a porous quartz glass base and this porous quartz glass base is presintered and then heat-treated by holding it under vacuum at a temperature in the range of from 1,100° C. to below the vitrification temperature for a certain time period. By this procedure, the amount of OH groups contained in the porous quartz glass base can be reduced and the base can be made to have a uniform OH group concentration. Consequently, the synthetic quartz glass obtained via this porous quartz glass base can have a reduced OH group amount and a uniform OH group concentration.

Preferably, the presintered porous quartz glass base has a bulk density of 0.3 to 0.8 g/cm$^3$. When the base has a bulk density within this range, the porous quartz glass base in step (c) can be more effectively made to have a reduced OH group amount and a uniform OH group concentration. The amount of OH groups is preferably 70 ppm or smaller and the OH group concentration is preferably within ±20 ppm based on the average value.

In step (c), the degree of vacuum is preferably 10 Pa or lower, especially preferably 1 Pa or lower, from the standpoint of effectively making the porous quartz glass base have a reduced OH group amount and a uniform OH group concentration. That is, step (c) is preferably carried out in the atmosphere having a pressure of 10 Pa or lower, especially preferably 1 Pa or lower. Furthermore, the time period in which the porous quartz glass base is held at a temperature in the range of from 1,100° C. to below the vitrification temperature is preferably 20 to 100 hours.

According to the process for synthetic quartz glass production of the invention, a synthetic quartz glass having a reduced OH group amount and a uniform OH group concentration can be obtained. This synthetic quartz glass can be used to produce, for example, an optical member having excellent optical properties.

BEST MODE FOR CARRYING OUT THE INVENTION

Figure 1:
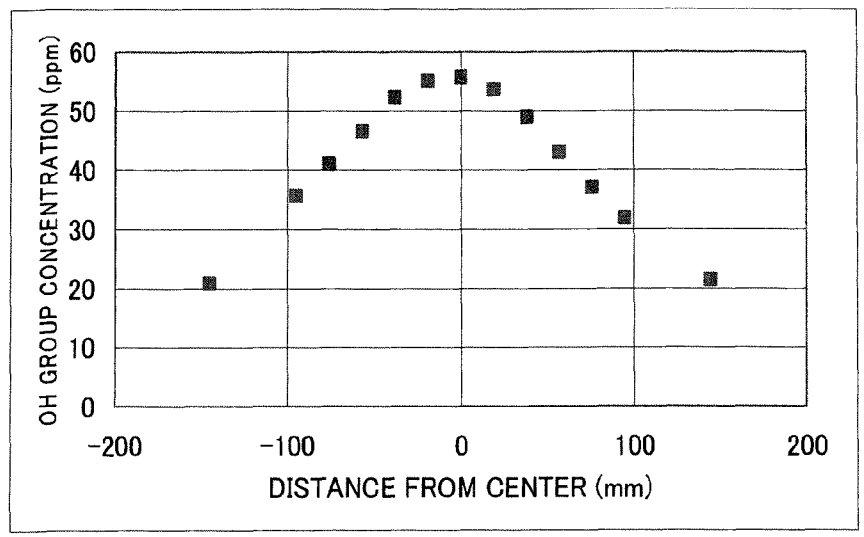
FIG. 1 is a graph showing the OH group concentration distribution of a synthetic quartz glass produced by the process for synthetic quartz glass production according to the invention.

An embodiment of the process for synthetic quartz glass production according to the invention is explained below in detail.

This embodiment comprises subjecting a glass-forming material to flame hydrolysis to synthesize fine quartz glass particles, depositing the fine quartz glass particles on a substrate to form a porous quartz glass base, presintering the thus obtained porous quartz glass base, holding the presintered porous quartz glass base under vacuum at a temperature in the range of from 1,100° C. to below the vitrification temperature for a certain time period, and then heating the porous quartz glass base to a temperature not lower than the vitrification temperature to obtain a synthetic quartz glass.

The glass-forming material is not particularly limited as long as it can be gasified. However, silicon halide compounds such as chlorides, e.g., $SiCl_4$, $SiHCl_3$, $SiH_2Cl_2$ and $Si(CH_3)Cl_3$, fluorides, e.g., $SiF_4$, $SiHF_3$ and $SiH_2F_2$, bromides, e.g., $SiBr_4$ and $SiHBr_3$, and iodides, e.g., $SiI_4$, are preferred from the standpoints of workability and cost.

The porous quartz glass base is formed by introducing any of those glass-forming materials into an oxyhydrogen flame to hydrolyze it and depositing the thus synthesized fine quartz glass particles on a substrate. It is preferred that this substrate on which the fine quartz glass particles are to be deposited should be rotated from the standpoint of regulating the shape of the bulk density distribution curve of the porous quartz glass to be obtained. The rotation speed of the substrate is typically in the range of 0.1 to 10 rpm although it varies depending on the rate of deposition of the fine quartz glass particles.

The porous quartz glass base thus obtained is relatively brittle and is hence presintered. The presintering is typically accomplished by heating the base in the atmosphere at around 1,350° C. for several hours. The bulk density of the presintered porous quartz glass base is preferably 0.3 to 0.8 $g/cm^3$. By conducting the presintering so as to result in a bulk density within the above range, sufficient rigidity can be imparted to the porous quartz glass base and the base can be made easily handleable. In addition, the bulk density regulation enables the porous quartz glass base to be effectively made to have a reduced OH group amount and a uniform OH group concentration during the heat treatment described below.

Subsequently, the presintered porous quartz glass base is heat-treated by holding it under vacuum at a temperature in the range of from 1,100° C. to below the vitrification temperature for a certain time period. By this treatment, the amount of OH groups contained in the porous glass base is reduced and the OH group concentration therein is made uniform. The reasons why the amount of OH groups contained in the porous quartz glass base is reduced and the OH group concentration therein is made uniform are thought to be as follows.

Namely, when the porous quartz glass base is heat-treated at a temperature in the range of from 1,100° C. to below the vitrification temperature, the leftward thermal-dissociation reactions in by the following reaction scheme 1 proceed, whereby OH groups or hydrogen atoms (H) dissociate from silanol groups (Si—OH) present in the porous glass base. Many of the dissociated OH groups (.OH) and hydrogen atoms (.H) combine with each other in the course of cooling to become water vapor, which is discharged from the system. By conducting this heat treatment under vacuum, the dissociated .OH and .H are inhibited from recombining with the Si. or Si—O. present in a radical state in the course of cooling. Thus, OH groups are sufficiently diminished even in inner parts of the porous glass base.

(Reaction Scheme 1)

In this heat treatment, the degree of vacuum is preferably 10 Pa or lower, especially preferably 1 Pa or lower. That is, the heat treatment is preferably carried out in the atmosphere having a pressure of 10 Pa or lower, especially preferably 1 Pa or lower. By regulating the degree of vacuum to 10 Pa or lower, the porous quartz glass base can be effectively made to have a reduced OH group amount and a uniform OH group concentration.

The temperature at which the porous quartz glass base is held is in the range of from 1,100° C. to below the vitrification temperature. In case where the heating temperature is lower than 1,100° C., a relatively long time is required for the porous quartz glass base to come to have a sufficiently reduced OH group amount and a sufficiently uniform OH group concentration and this may result in reduced productivity. When the heating temperature is not lower than the vitrification temperature, there is a possibility that vitrification might disadvantageously proceed from the surface of the porous quartz glass base, resulting in an insufficient reduction in OH group amount. Incidentally, the vitrification temperature depends on the glass composition. In the case of synthetic quartz glasses, it is preferred to conduct the heat treatment at a temperature lower than 1,330° C. taking the productivity into account.

The time period in which the porous quartz glass base is held at a temperature in the range of from 1,100° C. to below the vitrification temperature is preferably 20 to 100 hours. By regulating the holding period to 20 to 100 hours, the porous quartz glass base can be effectively made to have a reduced OH group amount and a uniform OH group concentration.

Subsequently, the heat-treated porous quartz glass base is heated to a temperature not lower than the vitrification temperature to thereby produce a synthetic quartz glass. This vitrification treatment and the heat treatment described above may be conducted in respective separate heating apparatuses. In this case, however, it is preferred to take a measure in, for example, preventing water adsorption during transfer. Consequently, it is more preferred to conduct the vitrification treatment and the heat treatment in the same heating apparatus.

The synthetic quartz glass obtained through the steps described above can have an OH group content reduced to 70 ppm or lower and OH group concentrations distributed within ±20 ppm based on the average value. Furthermore, when the temperature at which the porous quartz glass base is held is optimized and the holding period is regulated to 40 hours or longer, then the resultant synthetic quartz glass can have an OH group content of 30 ppm or lower and OH group concentrations distributed within ±5 ppm based on the average value.

EXAMPLES

In order to ascertain the effects of the invention, synthetic quartz glasses were obtained by the process for synthetic quartz glass production described above in which the heat treatment under vacuum of a presintered porous quartz glass base of a substantially cylindrical shape was conducted while varying the temperature at which the porous quartz glass base was held and the period of the holding. Each of these synthetic quartz glasses was placed in a carbon mold and molded at a temperature of 1,750° C. or higher in an inert atmosphere. Thereafter, each glass was examined for the amount of OH groups contained therein and for OH group concentration distribution. Examples 1 to 5 are examples according to the invention, and Example 6 is a comparative example.

The porous quartz glass base in Example 1 was held at 1,250° C. for 24 hours, and the OH group concentration distribution of the synthetic quartz glass obtained therefrom is shown in FIG. 1.

Figure 2:
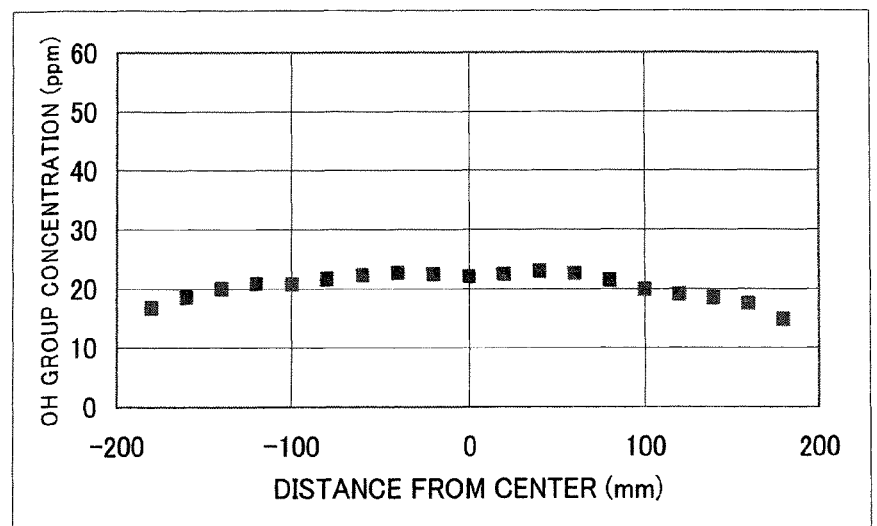
FIG. 2 is a graph showing the OH group concentration distribution of a synthetic quartz glass produced by the process for synthetic quartz glass production according to the invention.

The porous quartz glass base in Example 2 was held at 1,250° C. for 48 hours, and the OH group concentration distribution of the synthetic quartz glass obtained therefrom is shown in FIG. 2.

Figure 3:
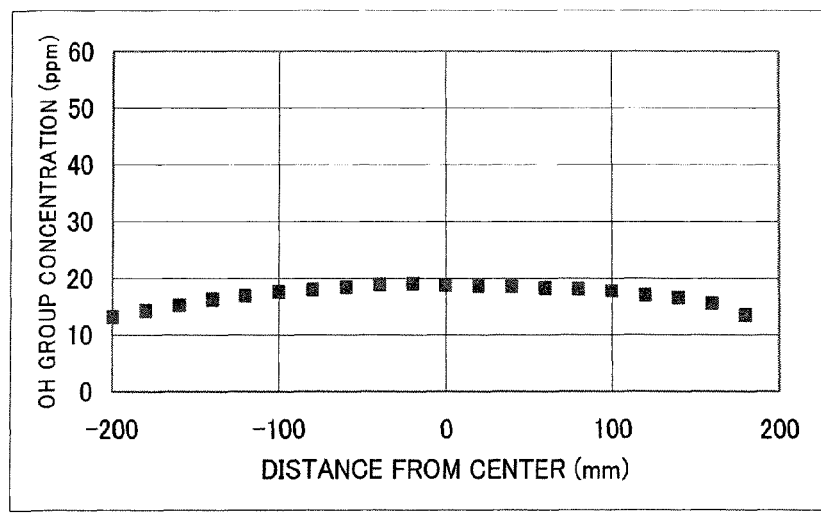
FIG. 3 is a graph showing the OH group concentration distribution of a synthetic quartz glass produced by the process for synthetic quartz glass production according to the invention.

The porous quartz glass base in Example 3 was held at 1,250° C. for 72 hours, and the OH group concentration distribution of the synthetic quartz glass obtained therefrom is shown in FIG. 3.

Figure 4:
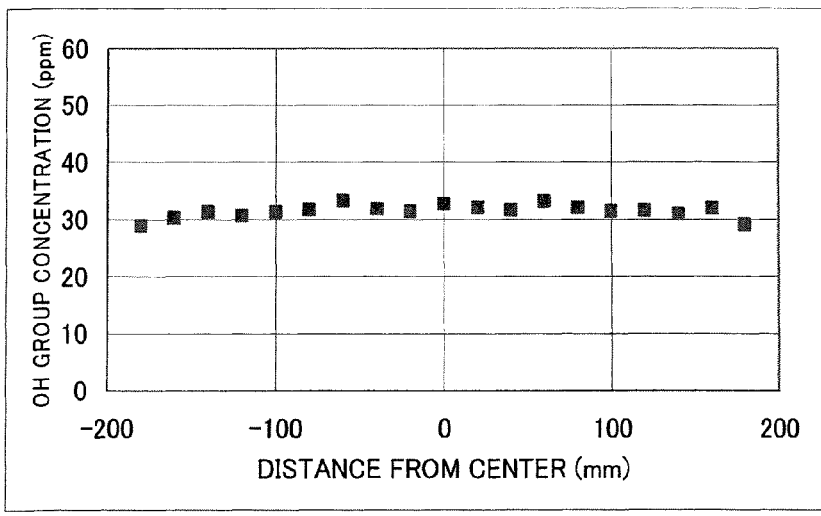
FIG. 4 is a graph showing the OH group concentration distribution of a synthetic quartz glass produced by the process for synthetic quartz glass production according to the invention.

The porous quartz glass base in Example 4 was held at 1,300° C. for 160 hours, and the OH group concentration distribution of the synthetic quartz glass obtained therefrom is shown in FIG. 4.

Figure 5:
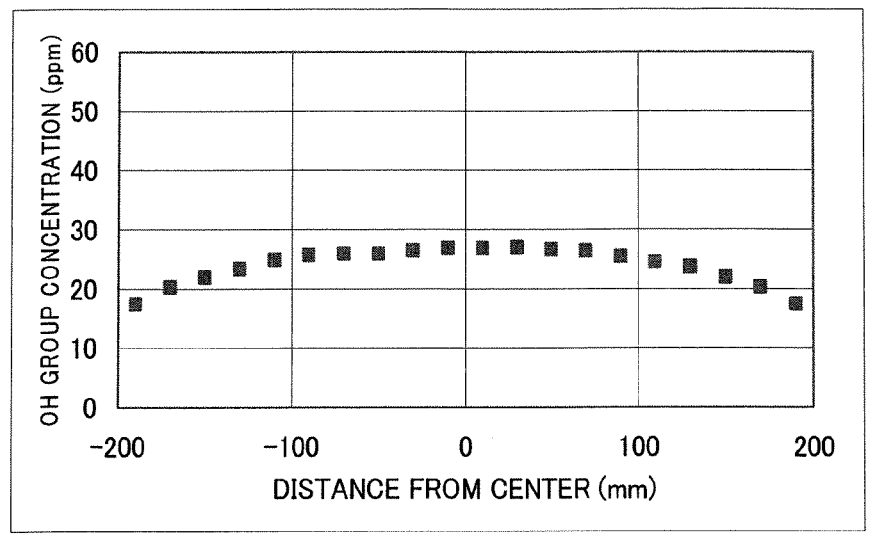
FIG. 5 is a graph showing the OH group concentration distribution of a synthetic quartz glass produced by the process for synthetic quartz glass production according to the invention.

The porous quartz glass base in Example 5 was held at 1,150° C. for 48 hours, and the OH group concentration distribution of the synthetic quartz glass obtained therefrom is shown in FIG. 5.

Figure 6:
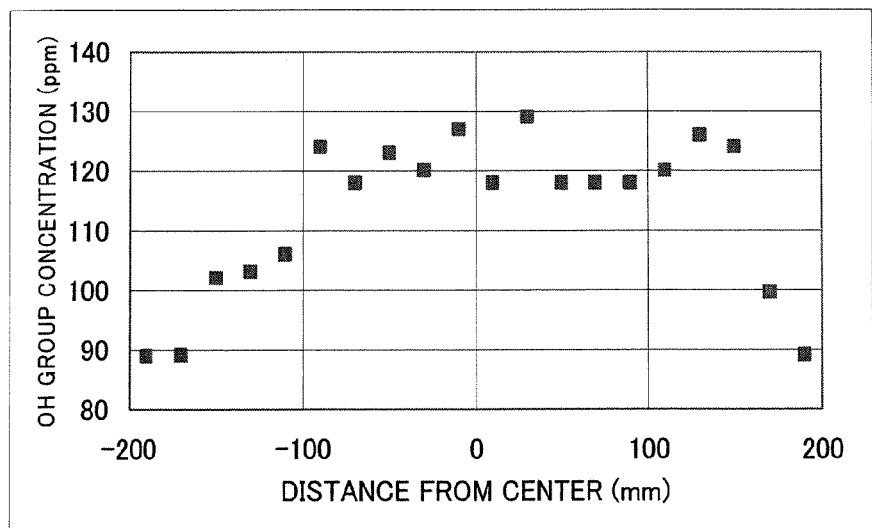
FIG. 6 is a graph showing the OH group concentration distribution of a synthetic quartz glass prepared as a comparative example.

The porous quartz glass base in Example 6 was held at 1,350° C. for 50 hours, and the OH group concentration distribution of the synthetic quartz glass obtained therefrom is shown in FIG. 6.

FIGS. 1 to 6 each shows the results of an examination of the synthetic quartz glass of a substantially cylindrical shape with respect to a section thereof perpendicular to the axis of the glass; the distance to each measurement point from the section center (radius) is plotted as abscissa and the OH group concentration at each measurement point as ordinate.

It can be seen from FIGS. 1 to 4 that as the time period in which the porous quartz glass base is held in the heat treatment under vacuum is prolonged, the OH group concentration in the synthetic quartz glass obtained tends to become more uniform.

In the synthetic quartz glass of Example 1, which was obtained through 24-hour holding at 1,250° C., the range of OH group concentration fluctuations (ΔOH: (maximum value)−(minimum value)) is 34.9 ppm. In case where the OH group concentration fluctuates beyond that range, there is a possibility that such fluctuations might adversely influence the optical properties of optical members to be produced therefrom. It is therefore preferred that the time period in which the porous quartz glass base is held in the heat treatment under vacuum is 20 hours or longer.

On the other hand, in the synthetic quartz glass of Example 3, which was obtained through 72-hour holding at 1,250° C., the range of OH group concentration fluctuations was 5.9 ppm. In the synthetic quartz glass of Example 4, which was obtained through 160-hour holding at 1,300° C., the range of OH group concentration fluctuations was 4.5 ppm. It is thought from these results that although the holding of the porous quartz glass base for more than 100 hours in the heat treatment under vacuum is effective in attaining a uniform OH group concentration, the degree of uniformity enhancement is relatively low and the improvement in uniformity is almost saturated. Consequently, it is preferred that the time period in which the porous quartz glass base is held in the heat treatment under vacuum should be 100 hours or shorter.

As shown in FIG. 6, the OH group concentration of the synthetic quartz glass of Example 6, which was obtained through holding at 1,350° C., was as relatively high as 109.9 ppm on the average (minimum, 65.4 ppm; maximum, 129 ppm). In contrast, with respect to the synthetic quartz glasses of Example 2 and Example 5, in which the porous quartz glass base in the heat treatment under vacuum was held at a temperature in the range of from 1,100° C. to below 1,330° C., the average OH group concentrations thereof were as low as 20.4 ppm and 24.0 ppm, respectively, as shown in FIG. 2 and FIG. 5. It can be seen that the heat treatment at temperatures in the range was effective in reducing the amount of OH groups in the synthetic quartz glass. It is therefore preferred that the range of temperatures at which the porous quartz glass is held in the heat treatment under vacuum is from 1,100° C. to below 1,330° C.

While the present invention has been described in detail and with reference to specific embodiments thereof, it would be apparent to one skilled in the art that various changes and modifications can be made therein without departing from the spirit and scope thereof.

This application is based on Japanese Patent Application No. 2005-029124 filed Feb. 4, 2006, the contents thereof being herein incorporated by reference.

INDUSTRIAL APPLICABILITY

According to the process for synthetic quartz glass production of the invention, a synthetic quartz glass having a reduced OH group amount and a uniform OH group concentration can be obtained. This synthetic quartz glass can be used to produce, for example, an optical member having excellent optical properties.

The invention claimed is:
1. A process for producing a synthetic quartz glass, comprising:
(a) depositing fine quartz glass particles synthesized by flame hydrolysis of a glass-forming material, on a substrate, to form a porous quartz glass base;

(b) presintering the porous quartz glass base in an atmosphere consisting of air;

(c) heat-treating the presintered porous quartz glass base by holding it under vacuum at a temperature in the range of from 1,100° C. to below the vitrification temperature for a time ranging from 48 hours to 100 hours; and (d) heating the thus heat-treated porous quartz glass base to a temperature not lower than the vitrification temperature to obtain a synthetic quartz glass.

2. The process for producing a synthetic quartz glass of claim 1, wherein the presintered porous quartz glass base has a bulk density of 0.3 to 0.8 g/cm$^3$.

3. The process of claim 2, wherein in (c), the degree of vacuum is 1 Pa or lower.

4. A synthetic quartz glass produced by the process of claim 2, wherein the synthetic quartz glass has an OH group concentration distribution which is within ±20 ppm based on an average value, and an OH group concentration of 70 ppm or lower.

5. The synthetic quartz glass of claim 4, wherein the synthetic quartz glass has an OH group concentration distribution which is within ±5 ppm based on an average value, and an OH group concentration of 30 ppm or lower.

6. The process of claim 2, wherein in (c), the time period of holding the porous quartz glass base at a temperature in the range of from 1,100° C. to below the vitrification temperature is from 50 to 100 hours.

7. The process of claim 2, wherein in (c), the time period of holding the porous quartz glass base at a temperature in the range of from 1,100° C. to below the vitrification temperature is from 72 to 100 hours.

8. The process for producing a synthetic quartz glass of claim 1, wherein the degree of vacuum in (c) is 10 Pa or lower.

9. A synthetic quartz glass produced by the process of claim 1, wherein the synthetic quartz glass has an OH group concentration distribution which is within ±20 ppm based on an average value.

10. A synthetic quartz glass produced by the process of claim 1, wherein the synthetic quartz glass has an OH group concentration of 70 ppm or lower.

11. The process of claim 1, wherein in (c), the degree of vacuum is 1 Pa or lower.

12. A synthetic quartz glass produced by the process of claim 1, wherein the synthetic quartz glass has an OH group concentration distribution which is within ±20 ppm based on an average value, and an OH group concentration of 70 ppm or lower.

13. The synthetic quartz glass of claim 12, wherein the synthetic quartz glass has an OH group concentration distribution which is within ±5 ppm based on an average value, and an OH group concentration of 30 ppm or lower.

14. The process of claim 1, wherein in (c), the time period of holding the porous quartz glass base at a temperature in the range of from 1,100° C. to below the vitrification temperature is from 50 to 100 hours.

15. The process of claim 1, wherein in (c), the time period of holding the porous quartz glass base at a temperature in the range of from 1,100° C. to below the vitrification temperature is from 72 to 100 hours.

16. The process of claim 1, wherein (b) presintering the porous quartz glass base is conducted in the atmosphere at around 1,350° C.

17. The process of claim 1, wherein said porous quartz glass base of (a) consists essentially of $SiO_2$ and OH;

said porous quartz glass base of (b) consists essentially of $SiO_2$ and OH; and said porous quartz glass base of (c) consists essentially of $SiO_2$ and OH.

18. The process of claim 1, wherein said synthetic quartz glass is in the form of a cylinder.

* * * * *